L. STURM.
FARROWING BOX.
APPLICATION FILED JULY 19, 1916.
1,230,237.
Patented June 19, 1917.
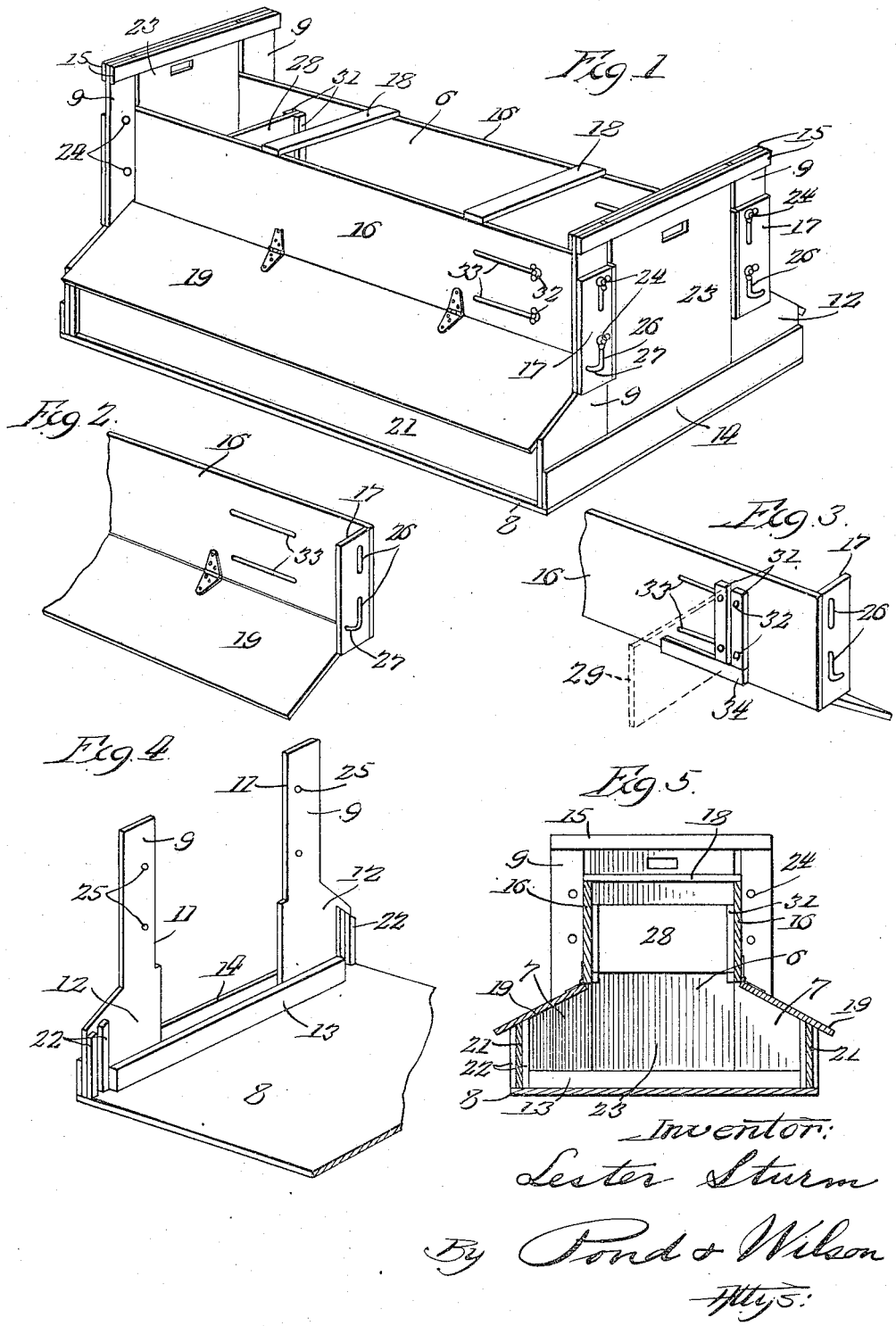
Inventor:
Lester Sturm
By Pond & Wilson
Attys.

UNITED STATES PATENT OFFICE.

LESTER STURM, OF ROSCOE, ILLINOIS.

FARROWING-BOX.

1,230,237. Specification of Letters Patent. Patented June 19, 1917.

Application filed July 19, 1916. Serial No. 110,183.

*To all whom it may concern:*

Be it known that I, LESTER STURM, a citizen of the United States, residing at Roscoe, in the county of Winnebago and State of Illinois, have invented certain new and useful Improvements in Farrowing-Boxes, of which the following is a specification.

This invention relates in general to animal husbandry, and has more particular reference to confining and housing devices known as farrowing boxes in which a sow may be confined while farrowing her young.

The primary object of my invention is to provide a device of this character embodying advantageous improvements in design and construction. I have further aimed to provide a farrowing box having various adjustments, whereby the confining walls may be adjusted to accommodate different sized sows so that in each case a sow may be confined in a compartment of the proper size to obtain the best results.

My invention also contemplates the provision of a farrowing box constructed so that it may be shipped in knocked-down form so as to be conveniently and cheaply transported and capable of being easily assembled.

These objects and other attendant advantages will be apparent as the invention becomes better understood by reference to the following description when considered in connection with the accompanying drawings, in which—

Figure 1 is a perspective view of a farrowing box embodying my improvements;

Figs. 2 and 3 are fragmentary perspective views of the central compartment side walls and the attached lids for the side wing compartments;

Fig. 4 is a fragmentary perspective view showing the upright standards at one end of the box and the manner in which they are attached to the base; and Fig. 5 is a transverse sectional view through the farrowing box.

My improved farrowing box comprises, generally stated, a housing shaped to provide an elongated central compartment 6 in which a sow may be confined and side wing compartments 7 for the young pigs, and various movable closures and walls serving advantageous purposes, all of which will be presently fully described.

In order that the box may be in the form of an independent structure capable of being shifted around and set in any suitable place and to prevent a sow from shifting the box or rooting the ground I have mounted the box structure on a rectangular base 8. Upon each end of the base is mounted in spaced relation a pair of upright standards 9 having their inner edges cut away at 11 for a purpose to be described later and having enlarged base portions 12 constituting the end walls and defining the cross-sectional shape of the side wing compartments 7. Each pair of standards 9 has attached to its lower inner sides a 2x4 or similar board 13 in turn rigidly secured to the base, as shown in Fig. 4, and has attached to its outer sides a baseboard 14, whereby the standards are fixedly secured to the base in upright spaced relation. The upper ends of each pair of standards may be connected together by means of tie bars 15 secured to opposite sides of the standards.

As shown in Fig. 5, there is no obstruction between the side wing compartments and the lower portion of the central compartment, while the upper portion of the central compartment is defined by side walls 16. The ends of these side walls located in the cutaways 11 of the standards 9 and resting on the shoulders at the lower ends of said cutaways project beyond the ends of the standards and are equipped with end pieces 17 which fit flat against the outer sides of said end standards and are adapted to be secured thereto for holding the side walls 16 in position. These side walls may be joined at their tops by suitable braces 18, thus providing an open-top compartment to allow free ventilation. The tops and outer sides of the side wing compartments are defined respectively by inclined lids 19 hingedly connected to the side walls 16 and vertical outer walls 21 detachably held in position by means of cleats or guides 22 secured to the standards 9 and permitting the outer walls 21 to be raised and removed from the box. It will be noted that the lids rest on the top of the outer walls 21 and may be swung upwardly to allow free access to the side wing compartments and that the outer walls 21 may be removed in order that clean bedding may be placed in the box and the same may be easily and thoroughly cleaned. The ends of the central compartment are defined by movable gates or closures 23 which when moved to open position permit passage to and from the box. These closures, fitting between the side walls 16 and lower portions of the standards 9 and located at their lower ends between the base members 13 and 14 and at their upper ends between the tie bars 15, form a very simple and substantial slidable gate which may be easily raised to give access to the central compartment and which when once dropped to position are automatically locked against being accidentally opened.

For the purpose of adjusting the height and width of the central compartment defined by the walls 16, I have mounted these walls so that they may be vertically and horizontally adjusted in a very simple manner and without the use of tools. To this end bolt and slot connections are provided between the end pieces 17 and standards 9. In the present instance, the bolts 24 equipped with thumb nuts pass through holes 25 in the standards 9 and through vertical slots 26 in the end pieces 17, thus allowing the side walls 16 to be raised a substantial distance from the position shown in Fig. 1. By providing the lower slots 26 with the arcuate extensions 27, the lower ends of the side walls 16 may be swung inwardly to narrow the central compartment, it being obvious that in case of such adjustment the closures 23 must necessarily be narrower than those shown in the present drawing. When the side walls 16 are raised the lids on the side wing compartments are correspondingly raised, the lids being of sufficient length to allow for this raising movement. It will thus be apparent that the size of the compartments may be varied as to height and width in a very simple manner.

As shown in Figs. 1, 3 and 5, partitions 28 and 29 are provided extending crosswise between the side walls 16 and spaced inwardly from the closures 23 to provide end walls which limit forward and backward movement of a sow. Consequently these end walls insure free passage at each end of the box between the side wing compartments 7 so that the young pigs may cross from one side to the other without danger of being trampled on or being injured by the sow. In the present instance these partitions 28 and 29 located respectively at the head and tail end of the box are guided between cleats 31 and rest on blocks at the base of the cleats so as to be freely removable to allow a sow to pass longitudinally through the central compartment. The partition 29 is adjustable longitudinally of the central compartment as shown in Fig. 3, so that the confining length of this compartment may be varied according to the length of the sow. For this purpose the cleats 31 are held in position by nuts 32 located in horizontal slots 33 in the side walls 16 and an elongated stop 34 is provided at the lower end of the cleats so as to be effective at any point to which the cleats 31 may be adjusted.

By means of the adjustability of various confining walls of the box, the same may be very quickly and easily adjusted after the sow has been positioned in the box, so that the sow has not too great freedom of movement nor is pinched or pressed by the confining walls.

Considering now the construction of the box as being advantageous for shipping in knocked-down condition and permitting easy assemblage, it will be noted that the main elements consist of a base, a pair of standards for each end of the base, and side walls for the central compartment to which walls are hingedly connected the lids of the side wing compartments. These elements are designed so that any unskilled person may very easily mount and attach them in the proper relation and when they have been thus positioned the removable elements such as the outer walls 21, gates or closures 23, and partitions 28 and 29 may be set in place without difficulty.

I claim:

1. A farrowing box having a central compartment, side wing compartments and passage openings at opposite ends of the central compartment, the tops of the side wing compartments being hinged to the side walls of the central compartment and free to move bodily vertically therewith, and means allowing the said side walls to be vertically adjustable whereby to vary the height of said compartments.

2. A farrowing box comprising a rectangular base, a pair of spaced upright standards secured to each end thereof and their lower portions constituting end walls of side wing compartments, movable closures for the openings between the standards of each pair, spaced upright walls interposed between the standards of each pair constituting side walls of a central compartment and having end pieces engaging and detachably secured to the outer sides of the standards, means for rigidly securing said end pieces to the standards, and lids hingedly attached to the side walls and forming the top of the side wing compartments.

LESTER STURM.

Copies of this patent may be obtained for five cents each, by addressing the "Commissioner of Patents, Washington, D. C."